Jan. 7, 1930.                    W. B. CHAPMAN                    1,742,691
                                 PNEUMATIC SPRING
                                Filed April 23, 1925

Inventor
William B. Chapman
By his Attorneys
Prindle Wright Neal & Bean

Patented Jan. 7, 1930

1,742,691

UNITED STATES PATENT OFFICE

WILLIAM B. CHAPMAN, OF JACKSON HEIGHTS, NEW YORK

PNEUMATIC SPRING

Application filed April 23, 1925. Serial No. 25,225.

The invention relates to a pneumatic spring consisting of piston and housing members, having an air cushion therebetween for the purpose of absorbing and relieving mechanical shocks transmitted from one member to the other. The spring is designed primarily as a support for vehicle bodies, thus serving as a substitute for the metallic springs usually employed for such purposes.

One important object of the invention is to provide a spring of the above type wherein the pressure in the pneumatic cushion which supports the load will be automatically increased by the addition of fluid to such cushion during the compression stroke so that an increase in the load carried is soon compensated for by a corresponding increase in the pressure of the sustaining cushion.

In another aspect the invention involves the use of what may be termed complementary air chambers on opposite sides of the piston member and the transfer of fluid under pressure from one chamber to the other in accordance with load conditions, thus securing a double balancing effect in that the building up of pressure on one side of the piston involves a drop in pressure on the other side which is cumulative in effect. Hence it is necessary to transfer but a minimum amount of fluid to obtain a maximum amount of effect.

Another feature of the invention is the employment of liquid in the spring in such manner that the flow of liquid induced by relative motion between the piston and cylinder, causes air to be aspirated into the sustaining air cushion during compression strokes. The liquid also serves to dampen the excessive resiliency of the air, and acts as a lubricant to keep the packing in proper condition.

Speaking more generally the invention aims to provide a pneumatic spring which will be simple in construction and mode of operation, which will operate over long periods without loss or replacement of the air and liquid employed therein, avoid the necessity of using metal springs, minimize leakages and make possible the long continued use of the same fluid therein, and which will adjust itself automatically to different load conditions and will absorb shocks without undue rebound or "hunting" action.

Further objects and advantages of the invention will be in part obvious and in part specifically pointed out in the description hereinafter contained which taken in conjunction with the accompanying drawings, discloses a preferred embodiment thereof. Such embodiment thereof, however, is to be considered merely as illustrative of its principles. In the drawings—

Figure 1:
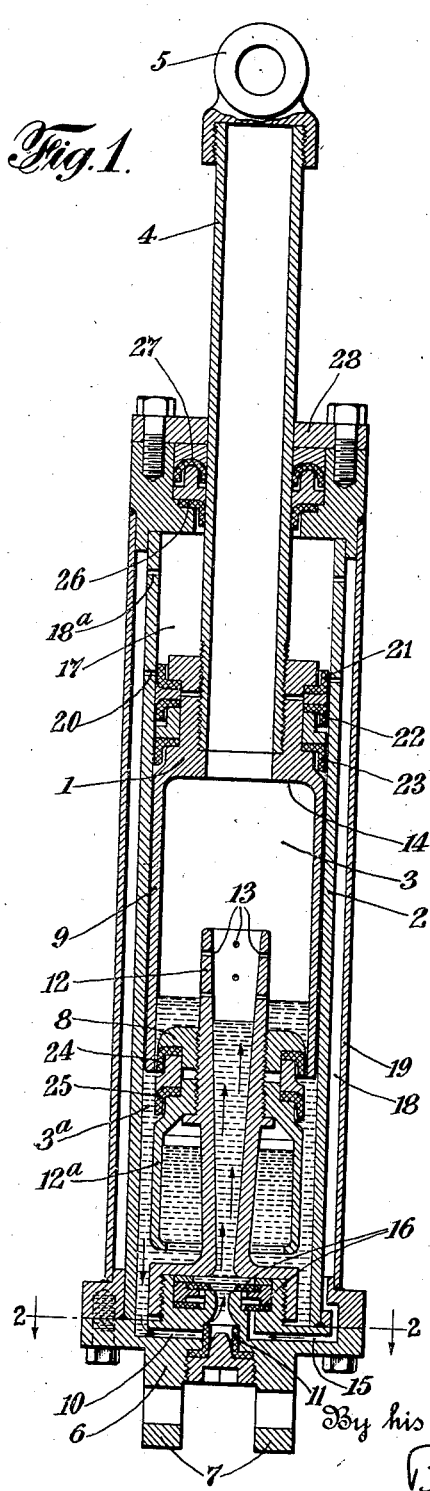
Fig. 1 is a central longitudinal sectional view of a pneumatic spring constructed in accordance with the invention.
Figure 2:
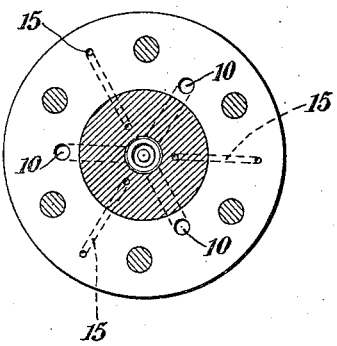
Fig. 2 is a transverse section taken on line 2—2 of Fig. 1, looking in the direction of the arrows.

The spring comprises in general a piston member 1 which is slidable in a cylinder 2, which provides a chamber 3 beneath the piston and containing air under pressure which serves to support the piston. When the device is to be used to support the body of a vehicle, the hollow stem 4 of the piston may be provided with a cap 5 containing bearings for one element of a universal joint (not illustrated), while the opposite end plate 6 of the cylinder is provided with ears 7 for similar purposes. Thus the weight of the vehicle body will rest upon the piston 1 and road inequalities will cause the piston and cylinder to slide back and forth relative to each other. Longitudinal and lateral strains on the vehicle preferably are taken care of by other parts on the vehicle so as to relieve the air spring from these strains.

The lower part of chamber 3 contains a suitable liquid, such as lubricating oil, and the piston and cylinder members are so constructed that as the piston moves downward on its compression stroke to reduce the size of chamber 3, the chamber is divided up into separate sections or compartments and oil is caused to flow from one compartment to the other. As shown, the bottom of chamber 3 is provided with a cylindrical head 8 suitably supported from the lower end wall of cylinder 2 and the piston member 1 is provided with an annular downwardly projecting extension 9 which in its upper range of movement moves back and forth in chamber 3 above the head 8, and thus does not cause the oil to move from one part of the chamber to another; but when the spring is subjected to a shock or the load to be carried is increased sufficiently to move member 9 downwardly past the head 8, the lower annular compartment 3ª between cylinder 2 and the head is cut off from the remainder of chamber 3. This compartment contains largely oil under pressure while the remainder of the chamber contains a relatively large proportion of compressed air. The pressure in the compartment 3ª, due to the relatively small amount of air contained, increases rapidly when the piston enters it and may be utilized to cause oil in said compartment to flow into the remainder of chamber 3 during the compression stroke of the piston. As shown a plurality of oil passageways 10 lead from the lower part of compartment 3ª through the end plate 6 of the cylinder and past a flexible packing member 11 which acts as a one-way valve, to a nozzle 12 mounted on the bottom end wall of the cylinder 2 and delivering into chamber 3. When member 9 moves down past the head 8 oil from compartment 3ª will therefore be forced through passageways 10 past valve 11 and through nozzle 12 into the chamber 3, at a velocity about as many times faster than the travel of the piston as the orifice in the injector is smaller than the displacement of piston extension 9 thus actuating the injector.

The valve 11 prevents any back flow of air from the nozzle into compartment 3ª during the return or upward strokes of the piston, the compartment 3ª being again filled with oil when piston extension 9 is raised above head 8 on the return stroke. This will cause a reduction of the pressure in compartment 3ª to a pressure below that in chamber 3, causing oil to flow past the one-way packings 24 and 25 (hereinafter described) from chamber 3 to compartment 3ª.

It is also possible to operate the injector above described by air or other gas, as well as by liquids, the essential condition being that the fluid be sufficiently compressed in compartment 3ª to flow rapidly through the injector. This difference in pressure between compartment 3ª and chamber 3 is brought about by having less elastic fluid in the compartment in proportion to the displacement of the piston extension 9, than is the case in chamber 3.

In order to prevent the dampening action to the spring from being too abrupt as piston extension 9 enters compartment 3ª, I provide a small amount of air therein, which may be accomplished, for example, by a bell-like member 12ª, supported from nozzle 12, and in which a small amount of air will be trapped when the oil is initially added to chamber 3. This will also prevent excessively high pressures in compartment 3ª and will smooth out the action of the injector.

Preferably the upper end of nozzle 12 projects somewhat above the normal level of the liquid in such chamber, and is provided with throttling openings 13 to permit a limited amount of oil to flow out from between the piston and head 8 as the piston nears the head. As the piston approaches the limit of its compression stroke I also prefer to segregate a portion of the oil into a confined space, to check further extreme movements of the piston. In the present form of the invention the piston slides down past the upper end of nozzle 12 when the piston approaches the end of its compression stroke, thus confining oil between its face 14 and head 8 in such a way that the oil can escape from the confined space only very slowly through the vent holes 13. This prevents injury to the spring when subjected to severe shocks.

I also prefer to utilize the flow of oil caused by the compression strokes of the piston extension into compartment 3ª to produce a flow of additional air into chamber 3 during the compression stroke. This may be done by producing an injector or aspirator action in nozzle 12. As shown a plurality of air ports 15 lead into the entrance end of nozzle 12 through a pair of flexible packing disks 16 which act as one-way valves; thus as the piston extension 9 moves downwardly a jet of oil at high velocity will flow through the nozzle and cause valves 16 to lift and the air sucked in through such valves will be entrained with the oil and carried along into chamber 3.

The pneumatic pressure within the chamber is thus built up during the compression stroke of the piston to whatever extent required to sustain any increase in load to be carried and to assist in dampening the motion of the piston and bringing it back to normal position. It is found that a very rapid flow of oil may be brought about in the manner above described which will bring about a correspondingly rapid flow of air from the low to the high pressure cushion and will act very quickly to build up the pressure in chamber 3 and thus make the spring quickly responsive to any increase in the load to be carried.

I prefer to subject the piston 1 not only to the action of a sustaining pneumatic cushion in chamber 3 but also to what may be termed complementary changes of pressure upon its opposite faces, whereby a building up of pneumatic pressure in chamber 3, for example, is accompanied by a corresponding reduction in pressure on the upper face of the piston. In the present form of the invention cylinder 2 also provides a chamber 17 of lower pressure acting upon the upper face of the piston and the air ports 15 draw their air from this chamber, for example, through the annular space 18 between cylinder 2 and a jacket 19 enclosing the latter, whereby the space 18 in effect constitutes a part of chamber 17. During compression strokes of the piston 1 the latter is therefore urged back to normal position not only by the building up of pressure in chamber 3 beneath the piston but also by reduction in pressure in chamber 17.

If the load on the piston is lightened or the pressure in chamber 3 built up to such an extent as to urge the piston up to an abnormally high position, the pressure in chamber 3 may be relieved, for instance, by providing one or more suitable bleed openings 20 leading to chamber 17 or 18 and which are uncovered by the piston under such conditions. The sensitiveness of the action of the piston may be determined by the position of these bleed openings; for example if the openings are placed relatively high the piston will tend to assume a normal position in which the lower end of piston extension 9 does not cut off compartment 3ª from the remainder of chamber 3 and under these conditions the spring will be more sensitive in its action. But if bleed openings 20 be placed in a lower position, the normal position of the piston will be such that piston extension 9 cuts off compartment 3ª from the remainder of chamber 3 more quickly and the pumping action of the oil occurs under smaller shocks, thus making the spring more sluggish in its movements.

The chamber 17 may be connected with the space 18 through further openings 18ª in cylinder 2, such openings being preferably positioned so as to be covered by the piston if the latter should move to any extreme upper position. A certain amount of air will then be confined in chamber 17 and act as a dashpot to prevent the piston from bumping against the upper end wall of the cylinder.

It will be noted that the same body of air is circulated around through chambers 3 and 18 during the action of the spring whereby neither the air nor the oil will require replacement aside from unavoidable leakage. The leakage will also be reduced to a minimum since the lower end of the cylinder 2 may be permanently closed from the outside air, whereby there may be no leakage through packed joints from the high pressure chamber to the outside air. Preferably the piston 1 is provided with flexible cup packings 21, 22 and 23 to prevent leakages past the piston from chamber 3 to chamber 17, and leakage from compartment 3ª is prevented by similar flexible cup packings 24 and 25. It will thus be seen that any leakage out of the high pressure cushion must be into the low pressure cushion and from thence it is automatically pumped back as required to sustain the load. The joint for the piston stem 4 may also be packed by similar flexible cupped packings 26 and 27 held in place by the end plate 28.

In case the pressure in chamber 17 should drop below atmospheric pressure for any reason, such as an abnormally high pressure in chamber 3, the packings 26 and 27 will yield to permit outside air to flow into chamber 17, or if the packings 26 and 27 should become leaky the spring will still function, but without changes of pressure in chamber 17 complementary to those produced in chamber 3.

While a preferred embodiment of the invention has been disclosed it will be obvious that many changes may be made therein without departing from its principles as defined in the following claims.

I claim:

1. A pneumatic spring comprising a piston member and chambers on opposite sides thereof containing fluid at different pressures, the fluid in the high pressure chamber acting as a sustaining cushion and automatic means for transferring fluid directly from low pressure chamber to the high pressure chamber upon movement of the piston toward the high pressure chamber.

2. A pneumatic spring comprising a piston member and a chamber on one side thereof, containing fluid under pressure to form a sustaining cushion, and means operated by the compressive force of said piston on the fluid in said chamber during compression strokes to cause additional fluid to flow into said chamber and means for relieving said chamber from excess pressures.

3. A pneumatic spring comprising a piston and a chamber on one side thereof, containing liquid and gas under pressure to form a sustaining cushion, means for causing additional liquid to flow into said chamber during compression strokes of the piston and for utilizing such liquid flow to aspirate additional gas into said chamber.

4. A pneumatic support comprising a piston member and a chamber on one side thereof containing fluid under pressure to form a sustaining cushion, said piston and chamber having parts meeting to divide the chamber into separate compartments as the piston travels into the chamber, means whereby fluid is caused to flow from said last mentioned compartment to the other compartment during compression strokes of the piston, said means including an injector acting to cause gas to flow along with the fluid.

5. A pneumatic support comprising a piston member and a chamber on one side of the piston containing fluid under pressure to form a sustaining cushion, said chamber having a head supported from its end wall and said piston having an annular extension adapted to move past said head to cut off a compartment from the chamber and a nozzle having a one way valve associated therewith for delivering fluid from said compartment to the chamber proper during compression strokes of the piston.

6. A pneumatic support comprising a piston member and a chamber on one side of the piston containing fluid under pressure to form a sustaining cushion, said chamber having a head supported from its end wall and said piston having an annular extension adapted to move past said head to cut off a compartment from the chamber, a nozzle having a one way valve associated therewith for delivering fluid from said compartment to the chamber proper during compression strokes of the piston and a further one way valve associated with said nozzle for admitting gas thereto.

7. A pneumatic spring comprising a piston member, a chamber on one side of the piston containing fluid under pressure to form a sustaining cushion and a further chamber acting on the other side of the piston containing fluid at relatively low pressure, and means for transferring fluid from one chamber to the other upon movement of the piston.

8. A pneumatic spring comprising a piston member, a chamber on one side of the piston containing fluid under pressure to form a sustaining cushion, a further chamber on the other side of the piston containing fluid at relatively low pressure, and means for transferring fluid from the chamber of relatively low pressure to the sustaining chamber upon movement of the piston towards the sustaining chamber.

9. A pneumatic spring comprising a piston member, a chamber on one side of the piston containing fluid under pressure to form a sustaining cushion, a further chamber on the other side of the piston containing fluid at relatively low pressure, means for transferring fluid from the chamber of relatively low pressure to the sustaining chamber upon movement of the piston towards the sustaining chamber and means for permitting fluid to pass from said sustaining chamber to the chamber of relatively low pressure when the piston moves a predetermined amount towards the low pressure chamber.

10. A pneumatic spring comprising a piston member, a chamber on one side of the piston containing liquid and gas under pressure to form a sustaining cushion, a chamber on the other side of the piston and containing gas under relatively less pressure, means for causing liquid to flow into said sustaining chamber when the piston moves towards the latter, and means whereby said flow of liquid aspirates gas from the low pressure chamber into said sustaining chamber.

11. A pneumatic spring comprising a piston and a chamber on one side thereof, containing fluid to form a sustaining cushion, means for causing additional fluid to flow into said chamber during compression strokes of the piston and for utilizing such flow to aspirate gas into the said chamber.

12. A pneumatic spring having a piston and a chamber on one side thereof containing fluid under pressure, and means for circulating said fluid to aspirate additional fluid into said chamber.

13. A pneumatic spring comprising a piston member and a chamber on one side thereof containing fluid under pressure to form a sustaining cushion, a compartment associated with said chamber containing fluid subjected to relatively greater pressure during compression strokes of the piston, an injector adapted to deliver fluid from said compartment into the chamber, means for admitting additional fluid to said injector and means for forcing the fluid from said compartment through said injector.

14. A pneumatic spring comprising a piston member, a chamber on one side thereof, containing fluid under pressure to form a sustaining cushion, a chamber on the other side of the piston containing fluid under relatively less pressure, means for transferring fluid from the chamber of lower pressure to the higher upon movements of the piston, and means for permitting outside air to flow into the chamber of relatively low pressure.

15. A pneumatic spring comprising a piston member and a chamber on one side thereof, containing liquid and gas under pressure to form a sustaining cushion, a nozzle directed into said chamber, means whereby compressive movements of said piston toward said chamber cause liquid to flow through said nozzle into said chamber, and means for utilizing said liquid flow to aspirate further fluid into said chamber.

In testimony that I claim the foregoing, I have hereunto set my hand this 21st day of April, 1925.

WILLIAM B. CHAPMAN.